P. M. LINCOLN.
ELECTRICAL MEASURING INSTRUMENT.
APPLICATION FILED SEPT. 16, 1918.
1,417,671. Patented May 30, 1922.
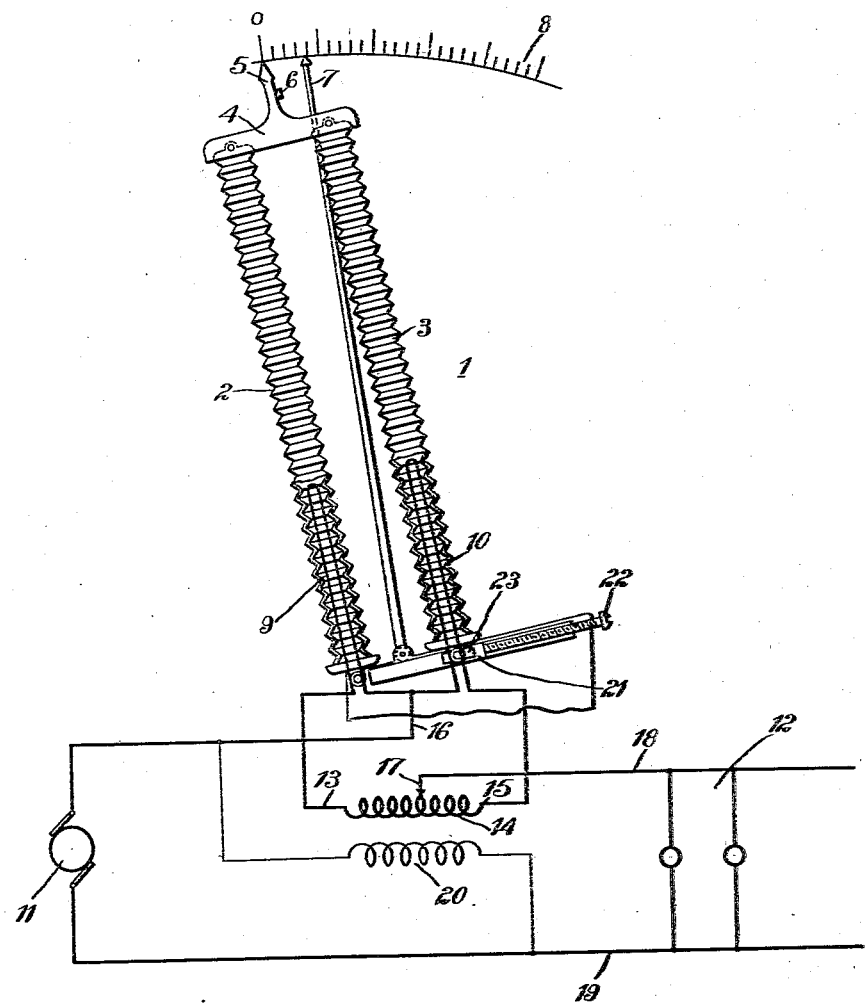
WITNESSES:
INVENTOR
Paul M. Lincoln
BY
ATTORNEY

UNITED STATES PATENT OFFICE.

PAUL M. LINCOLN, OF PITTSBURGH, PENNSYLVANIA.

ELECTRICAL MEASURING INSTRUMENT.

1,417,671.  Specification of Letters Patent.  Patented May 30, 1922.

Application filed September 16, 1918. Serial No. 254,209.

*To all whom it may concern:*

Be it known that I, PAUL M. LINCOLN, a citizen of the United States, and a resident of Pittsburgh, in the county of Allegheny and State of Pennsylvania, have invented a new and useful Improvement in Electrical Measuring Instruments, of which the following is a specification.

My invention relates to electric measuring instruments and particularly to calibrating devices therefor.

One object of my invention is to provide a calibrating device for a thermal demand meter that shall permit of the use of printed scales.

Another object of my invention is to provide a calibrating device, of the above-indicated character, that shall be simple and inexpensive to construct and effective in its operation.

Heretofore, it has usually been the custom to calibrate the scales of electrical meters after the same have been assembled. However, such calibrations are expensive and unreliable because the instrument mechanism is liable to become deranged before it is set in operation.

In view of the above, I provide means for easily shifting the pivotal point of one of the thermal-responsive members of a maximum-demand meter in order that the pointer may register with its full-load indication under full-load conditions. Since the line along which the pivotal point is moved, in adjusting the pointer, is normal to the initial position of the members, the adjustment does not affect the zero indication of the instrument but causes a proportionate adjustment throughout the range of the instrument. Thus, printed scales may be used and the cost of calibration and adjustment materially decreased.

The single figure of the accompanying drawings is a diagrammatic view of a maximum-demand meter embodying my invention.

U. S. Patent No. 1,156,412 granted to me October 12, 1915 discloses a slow-responding watt meter having a maximum-demand attachment in association with which type of instrument the preferred adaptation of my invention is here shown.

The watt meter 1 comprises, in general, two pivotally-mounted corrugated expansible members or receptacles 2 and 3 that are connected, at their upper ends, by a member 4 having a pointer 5. The pointer 5 is provided with a projection 6 for engaging a maximum-demand pointer 7 which, with the pointer 5, co-operates with a scale 8. Conductors 9 and 10 are disposed in the corrugated receptacles 2 and 3, respectively, for the purpose of heating a fluid therein. When the fluid is heated, the members 2 and 3 expand and thereby actuate the pointer 5 in accordance with the differential expansion of the members 2 and 3.

The meter 1 is operatively connected between a source 11 of electromotive force and a load circuit 12 for the purpose of indicating the maximum demand of energy consumed by the circuit 12. One terminal of the conductor 9 is connected to one terminal 13 of a transformer winding 14, the other terminal 15 of which is connected to one terminal of the conductor 10. The other terminals of the conductors 9 and 10 are connected together and, through a conductor 16, to one terminal of the source of electromotive force 11. The midpoint 17 of the transformer winding 14 is connected to one conductor 18 of the circuit 12, the other conductor 19 of which is connected to the opposite terminal of the source of electromotive force 11. A transformer winding 20 is connected across the terminals of the source of electromotive force 11. By this arrangement, the conductor 9 is traversed by current proportional to the sum of the voltage and current traversing the circuit 12, and the conductor 10 is traversed by current proportional to the difference of the current and voltage applied to the circuit 12. Thus, the fluid in the receptacles 2 and 3 will be heated in accordance with the sum and difference of the current and voltage traversing the circuit, and the differential expansion of the members 2 and 3 will be proportional to the power supplied to the circuit 12.

It is desirable, in measuring instruments, to use a printed scale 8 but, in constructing such instruments, slight irregularities have heretofore made it essential that each instrument be calibrated separately. In view of this, I provide a guideway 21 and a screw-threaded member 22 for adjusting the pivot point 23 of the member 3 over a short distance along a line that is normal to the initial or zero position of the members 2 and 3.

When full load traverses the circuit 12 the screw-threaded member 22 is adjusted to so move the end 23 of the member 3 to such position that the pointer 5 registers with the full-load indication on the scale 8. When the instrument is so adjusted it will respond in its adjustment by gradually decreasing amounts throughout its movement to indicate correctly. That is, the zero position will not be affected by the relatively small movement of the pivot point 23 normal to its initial position but the adjustment for every position up to the position to which it was adjusted will be gradually increasing, and a printed scale may be effectively used.

My invention is not limited to the specific type of meter illustrated, as it may be variously modified without departing from the spirit and scope of the invention as set forth in the appended claims.

I claim as my invention:

1. A measuring instrument comprising a pointer, a scale, differentially-acting thermal-responsive means for actuating the pointer, and mechanical means for adjusting the pointer to register with the division marks on the scale corresponding to the power being measured, said adjusting means being adapted to cause the pointer to indicate correctly throughout its movement.

2. A measuring instrument comprising two normally parallel pivotally-mounted expansible members, a pointer actuated by the differential expansion of the members and means for adjusting the pivotal point of one of the members.

3. A measuring instrument comprising two pivotally mounted thermal-responsive members, a pointer actuated by the differential expansion of the members and means for adjusting the pivotal point of one of the members.

4. A measuring instrument comprising two pivotally-mounted thermal-responsive members, a pointer actuated thereby and means for adjusting the pivotal point of one of the members to change the calibration of the instrument.

5. A measuring instrument comprising a scale, two pivotally-mounted thermal-responsive members, a pointer actuated thereby and means for adjusting the pivotal point of one member to cause the pointer to register with the division mark on the scale corresponding to the power being measured, said adjustment being such that the adjustment causes correct indication over the entire scale.

6. A measuring instrument comprising a pointer, a scale, differentially-acting means for actuating the pointer and mechanical means for adjusting the pointer to register with the division marks on the scale corresponding to the quantity being measured, said adjusting means being adapted to cause the pointer to indicate correctly throughout its movement.

In testimony whereof, I have hereunto subscribed my name this 31st day of Aug., 1918.

PAUL M. LINCOLN.